(12) United States Patent
Pekin

(10) Patent No.: US 7,861,454 B2
(45) Date of Patent: Jan. 4, 2011

(54) FISHING SYSTEM WITH REMOTE MONITORING CAPABLITY

(76) Inventor: David Pekin, 3210 Harbor View Dr., San Diego, CA (US) 92106

( * ) Notice: Subject to any disclaimer, the term of this patent is extended or adjusted under 35 U.S.C. 154(b) by 77 days.

(21) Appl. No.: 12/052,733

(22) Filed: Mar. 21, 2008

(65) Prior Publication Data

US 2009/0235572 A1  Sep. 24, 2009

Related U.S. Application Data

(63) Continuation-in-part of application No. 11/977,714, filed on Oct. 24, 2007, now Pat. No. 7,779,573, which is a continuation-in-part of application No. 11/307,840, filed on Feb. 24, 2006, now Pat. No. 7,318,295.

(51) Int. Cl.
*A01K 97/12* (2006.01)
*A01K 87/00* (2006.01)

(52) U.S. Cl. ............................................. 43/17; 43/16

(58) Field of Classification Search ............... 43/17, 43/17.1, 15, 16, 18.1 R; 242/223; *A01K 97/12, A01K 93/00*
See application file for complete search history.

(56) References Cited

U.S. PATENT DOCUMENTS

| | | | | |
|---|---|---|---|---|
| 2,575,049 A | * | 11/1951 | Dean | 43/17 |
| 4,051,616 A | * | 10/1977 | Mathauser | 43/17 |
| 4,339,888 A | * | 7/1982 | Sheng-Jung | 43/26.1 |
| 4,422,258 A | * | 12/1983 | Adams et al. | 43/17 |
| 4,516,348 A | * | 5/1985 | Hirose et al. | 43/17 |
| 4,640,038 A | * | 2/1987 | Jershin | 43/17 |
| 4,693,125 A | * | 9/1987 | Krutz et al. | 73/862.391 |
| 4,697,758 A | * | 10/1987 | Hirose et al. | 242/223 |
| 5,088,223 A | * | 2/1992 | Chu | 43/17 |
| 5,131,165 A | * | 7/1992 | Benson | 33/719 |
| 5,248,113 A | * | 9/1993 | Daniels | 242/246 |
| 5,259,252 A | * | 11/1993 | Kruse et al. | 73/862.391 |
| 5,639,038 A | * | 6/1997 | Hirose | 242/223 |
| 5,782,033 A | * | 7/1998 | Park et al. | 43/4 |
| 6,591,222 B2 | * | 7/2003 | Stiner | 702/173 |
| 7,322,253 B2 | * | 1/2008 | Owens | 73/862.391 |
| 7,562,488 B1 | * | 7/2009 | Perkins et al. | 43/17 |
| 2005/0193616 A1 | * | 9/2005 | Johnson | 43/17 |
| 2008/0066367 A1 | * | 3/2008 | Meeks et al. | 43/17 |
| 2008/0178514 A1 | * | 7/2008 | Pekin | 43/17 |
| 2008/0289242 A1 | * | 11/2008 | Cecil | 43/18.1 R |

* cited by examiner

*Primary Examiner*—Son T Nguyen
*Assistant Examiner*—Shadi Baniani

(57) ABSTRACT

The invention is a fishing system comprising a fishing pole with a force measuring device coupled to a transmitter. The transmitter broadcasts a signal including a representation of the force measured by the force measuring device. The fishing system includes a receiver configured to receive the transmitted force data generated by the fishing pole or poles. The receiver may be configured to display, store, or process force data received from said fishing pole or multiple fishing poles.

33 Claims, 7 Drawing Sheets

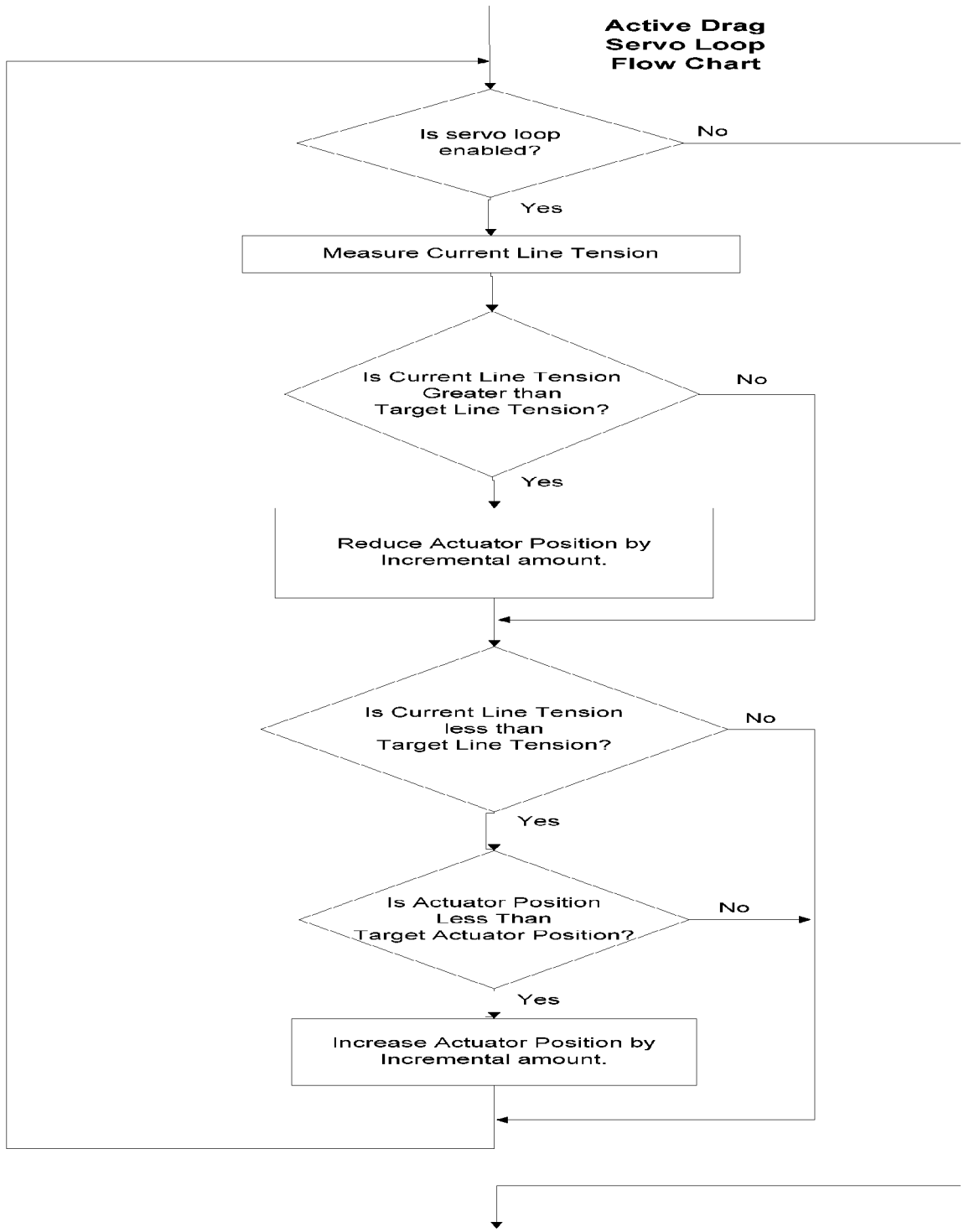

FISHING SYSTEM WITH REMOTE MONITORING CAPABLITY

CROSS REFERENCE TO RELATED APPLICATIONS

This application is a continuation-in-part of U.S. application Ser. No. 11/977,714, to Pekin, filed Oct. 24, 2007 now U.S. Pat. No. 7,779,573, which is a continuation-in-part of U.S. application Ser. No. 11/307,840, to Pekin, filed Feb. 24, 2006 now U.S. Pat. No. 7,318,295.

The invention is a fishing system comprising a fishing pole with an integrated line tension measuring device coupled to a transmitter in or on the pole and a receiver configured to receive and process line tension data generated by the line tension measuring device and transmitted by the transmitter.

In the preferred embodiment of the system the receiver would graphically display line tension as a function of time in a strip chart where line tension changes could be easily detected. In another, the receiver would store line tension data and information received from the fishing pole transmitter for later analysis and processing. And in another, the receiver would process line tension information in real time to actively control the fishing reel drag.

There are many advantages to a fishing system that allows the fisherman to monitor his pole remotely. Often times the fisherman will be at the helm or in the cabin while trolling. The fishing line tension may change for a variety of reasons. A fish may hit the bait or lure increasing the line tension. Line tension may also increase if the lure or bait becomes fouled with seaweed or kelp and having a fouled lure greatly reduces the chance of catching fish. Basically, the fisherman is interested in anything that changes the fishing line tension while trolling. This fishing system alerts the fisherman when there is a change in line tension whether he is at the pole, in the cabin, or at the helm.

The preferred embodiment of the fishing system enables the integration fishing line tension information into other fishing equipment. For example, the receiver could be connected to or integrated into a fish-finder, enabling the fish finder to display all pertinent electronically available fishing information (sonar fish return, water temp, and fishing line tensions) on a single screen. This is extremely useful and important information for the fisherman and having the information displayed on a single piece of equipment would be very advantageous.

It is well known that some fish fight harder than others. This fishing system allows the calculation of a completely new fishing metric, the "power" of the fish. The receiver in the preferred embodiment can be configured to mathematically integrate the line tension over the time it takes to catch a fish thereby calculating the actual power the fish exerted while being caught. Fishing tournaments could add a new category based on this new metric where the most powerful fish wins. Also, since many fishing tournaments support releasing fish, a supporting power metric could be added or required for catch and release tournaments.

This fishing system enables the potential identification of fish prior to its being caught. It is well known by those skilled in the art that fishermen can feel the "fin beat" as it is transferred from the fish through the line to the fishing pole. The fin beat frequency can be detected by feel by an accomplished fisherman. While fish are fighting against a line, their locomotion is primarily derived from oscillating thrust of their caudal or tail fin and one can feel that oscillation thrust or fin beat through the line. Studies have shown that the frequency that the fish modulates its tail fin is related to its size as well as its species. By transforming the line tension data from the time domain into the frequency domain by processing a Fourier transform or equivalent, the fishing system receiver can calculate the fundamental beat frequency of a fighting fish. A database of fish species and their typical fin beat rate could be searched and the result presented to the fisherman as the most likely fish at the end of the fisherman's line. Identification of the fish species is very important to some fishermen. Tournament fishing may value only certain species of fish. The ability to identify those species prior to landing the fish enables the fisherman to release or cut off unwanted species, thereby maximizing the time spent focusing on the target species.

The preferred embodiment of the fishing system enables the fisherman to record and save the line tension data during the time he fights the fish. The receiver in the preferred embodiment contains a data storage medium which stores the line tension data over time. This record line tension data can be replayed on the receiver or transferred to other devices such as a personal computer, to be analyzed after the fight.

The preferred embodiment of this fishing system works actively to help the fisherman land his fish. This system actively controls the reel drag which controls the maximum line tension presented by the reel through a servo feedback loop to prevent fishing line breakage resulting from the reel applying too much drag force. It is a fact that as the fishing line comes off the spool, the diameter of the spool containing the fishing line decreases. The drag force presented by a conventional fishing reel on the fishing line is directly related to the spool diameter. As the diameter of the spool decreases, the drag increases proportionately so as the fish pulls line off the reel, the drag is increasing, sometimes to the point of breaking.

This system uses a servo loop to actively control the drag applied by the reel. In the preferred embodiment, the user first sets his drag in the normal fashion. After setting the drag, the fisherman presses a "set drag" button on the receiver to store the current "set" position of the drag mechanism and current "set" position of the drag actuator. He then pulls the line off the reel against the drag in the direction from the reel towards the tip of the pole. This allows the line tension measuring device to measure the maximum line tension presented by the drag and allows the receiver to store this tension as the maximum target line tension for the servo loop. Pressing the "set drag" button a second time activates the servo loop to control the fishing reel drag.

In active mode the servo loop reads the current line tension from the line tension measuring device and, if the current line tension exceeds the stored target line tension, the drag actuator is commanded to reduce the drag until the measured line tension is at or below the stored maximum target line tension. If the measured line tension is less than the stored target line tension and the drag actuator had previously been commanded by the servo control loop to reduce the drag and the drag actuator is currently backed off from the "set" position, the drag actuator will be commanded to increase the its position back to its "set" position thereby returning the drag mechanism and reel drag back to it's original "set" position. The active drag mechanism of the fishing system will help prevent loosing fish due to increased reel drag due to reduced line spool diameter.

FIELD OF INVENTION

This invention applies to the field of sport fishing and more particularly to the design of fishing poles and electronic fishing equipment.

DISCUSSION OF PRIOR ART

The bell or noise making device on the end of the fishing pole has been a strike signaling device almost since fishermen have used fishing poles. When a fish attacks the bait, the pole tip flexes and the bell rings, alerting the fisherman. Mathauser (U.S. Pat. No. 4,051,616) and Dean (U.S. Pat. No. 2,575,049) advance the bell signaling device by disclosing a strike signaling device that can turn on a light or ring a buzzer to signal a strike. However, Mathauser's and Dean's devices are essentially two state devices, signal or no signal.

Pekin (U.S. Pat. No. 7,318,295) advanced the two state technology by disclosing a fishing pole with an integrated line tension measuring device. Pekin's device, rather than showing signal or no signal, continuously shows the fisherman the line tension present on the line tension measuring device. The line tension could be generated by pulling the line off the reel by hand to set or measure the drag, or by trolling, or fighting a fish, or lifting the fish after it is caught to measure its weight. Pekin shows line tension is very important information for the fisherman.

Many times while trolling the fisherman may be at the helm of the boat or in the cabin rather than next to his pole (s). When a fish of sufficient strength and weight strikes the lure, the reel clicker makes a noise alerting the fisherman. In other instances, kelp or debris may attach to or foul the lure. In this case, the line tension increase due to fouling may be insufficient to exceed the reel drag so that no clicker noise alerts the fisherman to this situation even though the line tension as increased. Trolling while dragging kelp or debris on a lure greatly reduces the likelihood of catching your target fish and fishermen want to know when they have picked up kelp or debris on their lure.

The present invention enables the fisherman to monitor the line tension on his pole (s) when he is in the cabin, at the helm or elsewhere. The preferred embodiment shows a receiver displaying a strip chart of line tension (s) over time. The receiver could be a mobile handheld display or a permanently mounted display. Upon seeing a change in line tension on the visual display or hearing an audible line tension warning or seeing a visual line tension warning, the fisherman could check the lure for snagged debris or kelp. Providing the fisherman with a visual or audible warning of line tension increase will thus enable the fisherman to better monitor his lures or bait and thereby be more effective and productive while trolling.

SUMMARY OF THE INVENTION

Accordingly, the preferred embodiment of the present invention is a fishing system including a pole with a line tension measuring device coupled to a transmitter, and a receiver capable of receiving and processing the transmitted signal. The transmitter technology may vary significantly between embodiments. Viable transmitter technologies include, but are not limited to, radio frequency (RF), infrared (IR), audible, or simple electrical signals through hard wiring. The fishing pole with line tension measuring device and transmitter measure the fishing line tension continuously and broadcast that information periodically. A receiver designed to receive and process the signal broadcast from the transmitter will convert the signal back into line tension information and display, process, or store this data. In the preferred embodiment the line tension will be displayed as a strip chart graph showing line tension over time and the line tension will be stored on electronic media for later analysis.

While the preferred embodiment includes an external receiver with a strip chart showing line tension over time, another embodiment may have the receiver located on the rod or in the fishing reel allowing a complete implementation of the active drag control system without an external receiver.

Further features and advantages of the invention will become apparent from the following detailed description and accompanying drawings which set forth illustrative embodiments in which the principles of the invention are described.

DESCRIPTION OF DRAWINGS

These and other objects, features and advantages of the invention will become more apparent upon reading the following detailed specification and drawings, in which.

FIG. (6) 6 is a flow chart detailing the active drag initialization sequence.

FIG. (7) 7 is a flow chart detailing the active drag servo loop.

DETAILED DESCRIPTION OF THE PREFERRED EMBODIMENTS

Figure 1:
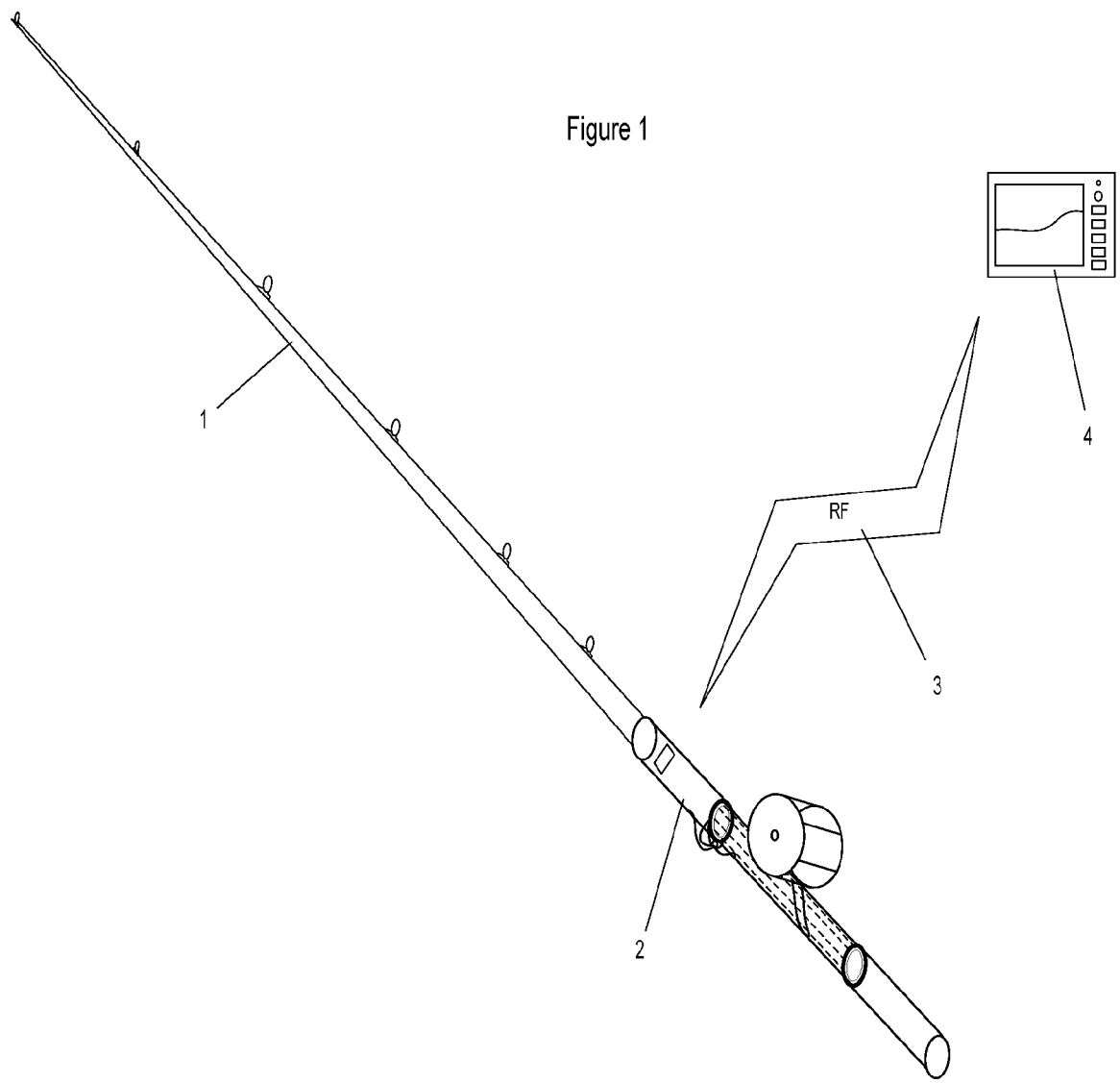
FIG. 1 shows a first embodiment of the fishing system including a pole with integrated line tension measuring device and RF transmitter and receiver with line tension display according to the invention.

FIG. 1 is a perspective view showing the preferred embodiment of the fishing pole (1) with integrated line tension measuring device and transmitter (2) according to the invention. The radio signal is graphically represented as the lighting bolt (3). The RF receiver with display is shown as (4).

Figure 2:
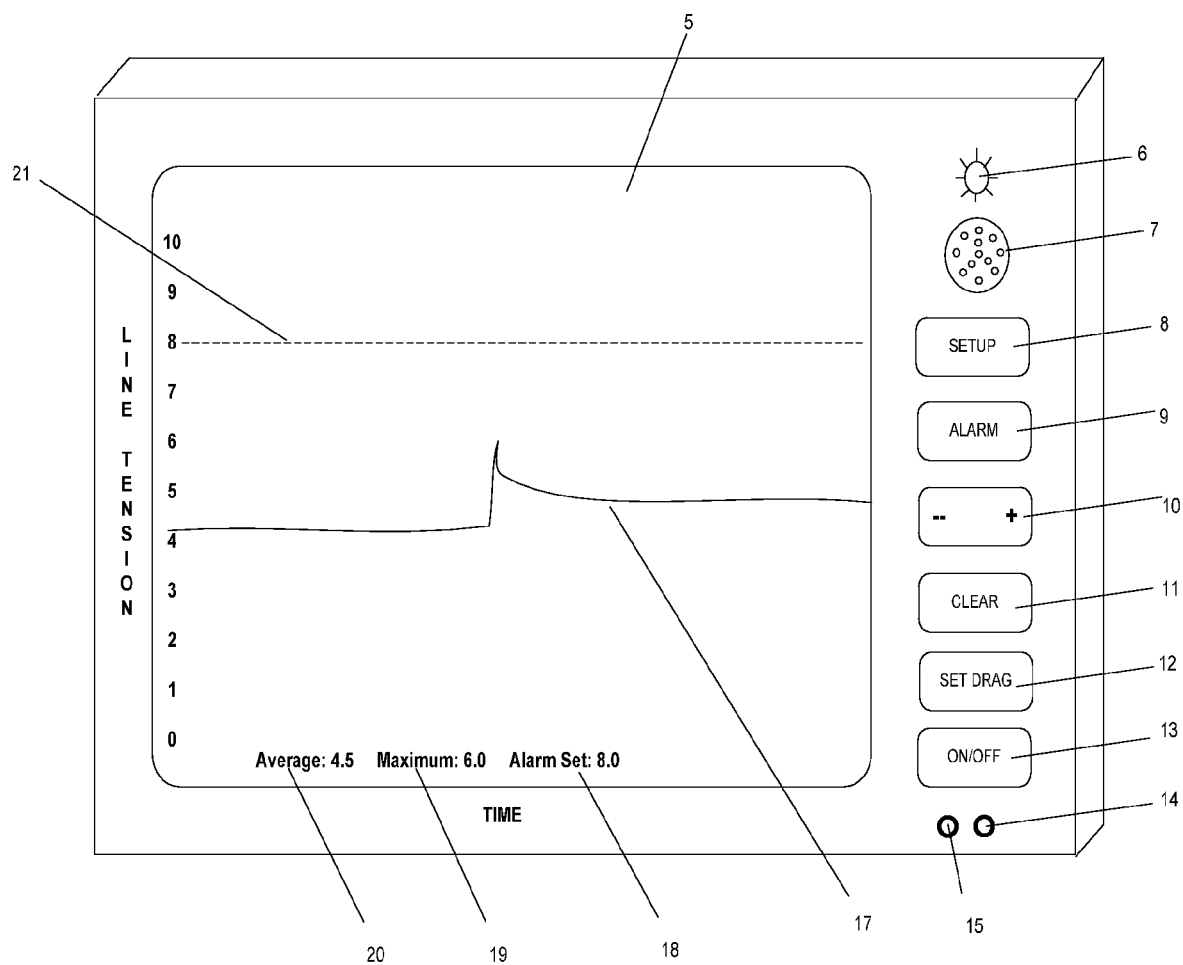
FIG. 2 is a detailed view of the RF receiver of the same embodiment.

FIG. 2 is a perspective view detailing the preferred embodiment of the RF receiver and display device according to the invention. The RF receiver (4 in FIG. 1) contains a visual display (5), alarm LED light (6), alarm speaker (7), a setup button (8), alarm button (9), an increment/decrement button (10), a clear button (11), a set drag button (12) an on/off power button (13), a data jack (14), and a reel drag control electrical connection (15). The electronics inside the RF receiver package are not shown. Batteries, also internal to the package, are not shown and supply the power to the RF receiver. In the preferred embodiment, the line tension display (5) is a liquid crystal display commonly called an LCD. A line tension trace (17) and a depiction of a line tension alarm (18) set at 8 pounds is shown on the display (5). The line tension visual warning (6) is a light emitting diode commonly called an LED. The line tension audible warning (7) is a piezo buzzer. The data jack (14) allows the connection of other electronic equipment to the sense an electrical output which varies in relation to the line tension measured on the pole and transmitted to the receiver. In this embodiment, the data jack (14) provides an analog voltage output proportional to the received line tension signal received. The electrical connection for active reel control (15) allows the electrical connection through a wire (39 in FIG. 3) to the reel to control the drag actuator motor (34 in FIG. 3).

The Setup button (8) allows the user to choose the tension display units, pounds or kilograms, and whether the tension alarm is on or off.

The Alarm button (9) allows the user to set the tension alarm threshold (shown on the display as 18). After the user presses the Alarm button, the −+ rocker button (10) will be activate. Pressing the − side of the button will decrease the alarm tension while pressing the + side will increase the alarm tension. As the user adjusts the alarm tension, the alarm tension visual indicator (21) and the alarm notice (18) will be updated accordingly.

The Clear button (11) will reset the Average (20) and Maximum (19) indicators and erase and restart the strip chart of the line tension versus time trace (17).

The receiver monitors the line tension received from the transmitter and stores and displays the maximum tension (19) in the selected units. Pressing the Clear button (11) resets the maximum tension hold register to 0. Monitoring the maximum tension display (19) would be used to set the drag on the fishing reel. The user would pull the line from the reel against the set drag until the reel drag slipped. The display would show the maximum amount of line tension applied by the reel drag.

The tension alarm mode monitors the line tension and activates the audible (4) and visual (3) warnings if the measured line tension exceeds the set threshold. Pressing Clear button (11) when the alarm is activated turns off the alarm. The tension alarm mode could be used to detect fish biting, or detect fouling of lures or hooks while fishing or trolling.

Figure 3:
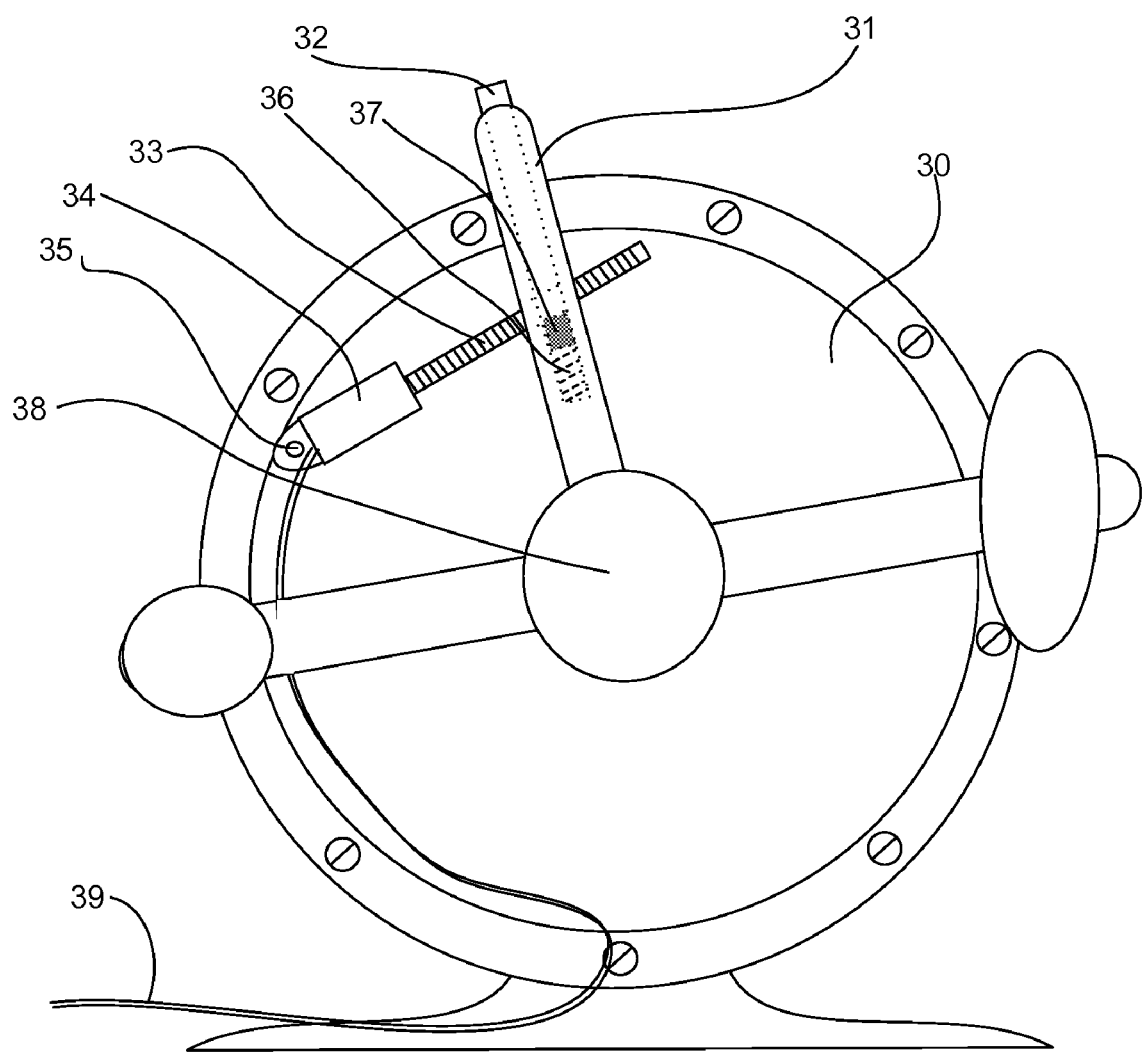
FIG. 3 is a detailed view of the reel with active drag control mechanism.

FIG. 3 is a perspective view detailing the preferred embodiment of a fishing reel (30) with active drag adjustment mechanism. This particular embodiment is integrated into a lever drag style reel which is common in the market today. The lever drag (31) is used to manually adjust the drag. In this embodiment, depressing the button (32) on the top of the lever drag acts like a clutch and disengages the internal thread capture mechanism (37) which is normally engaged by internal spring (36). Depressing the button (32) disengages the thread capture (37) and the lever drag works exactly like a standard lever drag, i.e. moving it towards the tip of the pole (when the reel is installed on the pole) increases the drag, and moving it back, towards the butt of the pole, decreases the drag. After the fisherman sets his drag to the setting he desires, he releases the button (32) which engages the thread capture mechanism (37) to the drive screw (33). In the engaged mode, if the electric motor (34) rotates the drive screw (33), the engaged thread capture mechanism (37) will adjust the lever drag forward or backward depending upon the direction of rotation of the motor (34). The motor (34) is mounted on a shaft (35) so that it can pivot as the angle between lever (31) and drive shaft (33) changes. The drag lever (31) typically rotates around the center of the reel (38) creating a variable angle between the drag lever and drive shaft depending upon the position of the lever. In active feedback mode, the motor (34) is controlled by the servo control loop in the RF receiver (not shown). The motor (34) is connected to the receiver via a wire (39). The receiver has a servo control loop using the line tension measuring device and target line tension as input and motor (34) position as output. When the fisherman sets the drag he desires using the lever, he then sets the target drag force on the receiver by pressing the Set Drag button (12 on FIG. 2) and then pulls the fishing line off the reel against the reel drag in the direction from the reel to the tip of the pole. This allows the drag tension to be measured by the line tension measuring device and the receiver to record and store this maximum line tension presented by the reel drag as the maximum target line tension. The target position of the actuator motor is stored at this time too. Thus the drag servo system acquires the target motor position and target drag tension to be allowed in active mode after the Set Drag button (12) is pushed. Pushing the Set Drag button (12) a second time places the system in active mode and activates the servo control loop. In active mode the servo control loop actively controls the reel drag mechanism by activating motor (34) which turns the threaded shaft (33) which applies a linear force to the thread capture block (37) which moves drag lever (31). The servo control loop commands the motor (34) to prevent the reel drag from creating line tensions in excess of the target drag tension. The flow chart for the servo system is detailed in FIGS. 6 and 7.

Figure 4:
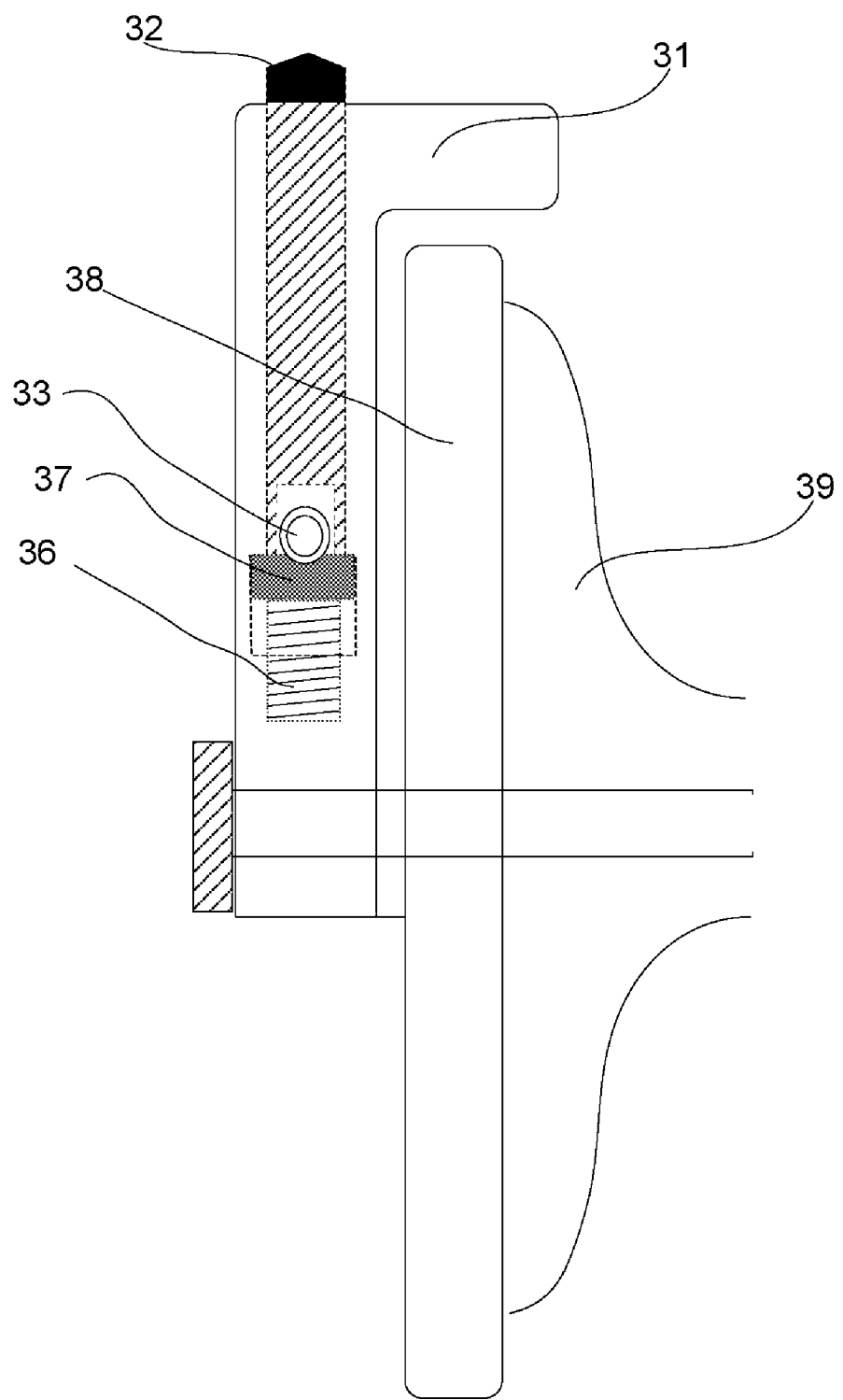
FIG. 4 is an exploded view of the active drag control clutch mechanism.

FIG. 4 shows an exploded view of the reel side plate (38), reel spool (39), lever drag (31) and clutch mechanism (32, 36 & 37). When the release button (32) on the top of the lever drag (31) is depressed, it pushes the thread capture (37) down against the spring (36) compressing the spring and releasing the thread capture (37) from the threaded shaft (33). This allows the fisherman to adjust the lever drag (31) freely with the thread capture mechanism disengaged.

Figure 5:
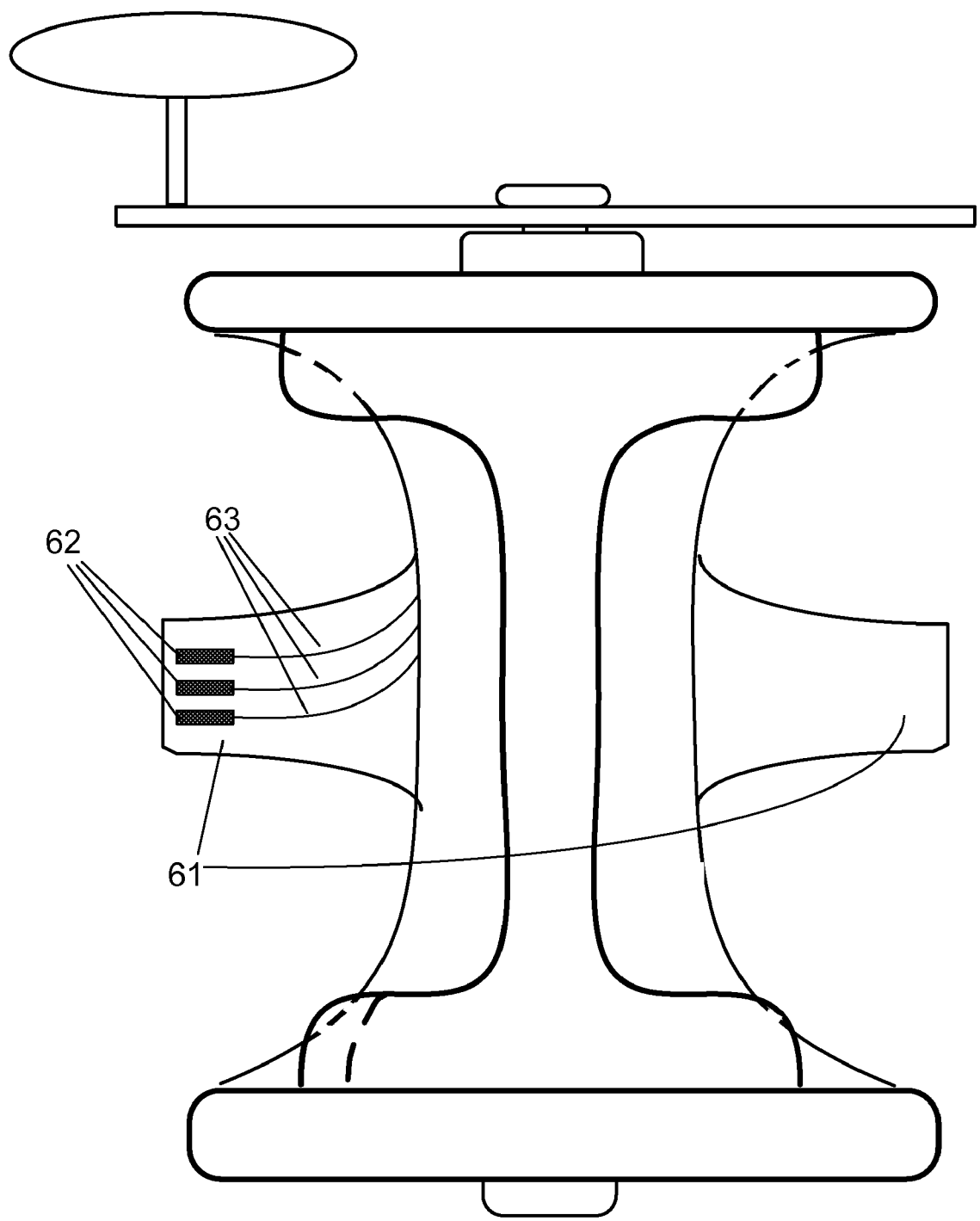
FIG. 5 is a top view of a reel detailing the electrical connection embedded on the reel mounting tongue.

FIG. 5 is a top view of a reel with electrical connections embedded on the surface of the mounting tongue. As is common in the industry, the mounting tongue (61) mates with a receiver portion on the reel seat to secure the reel. The reel tongue of the preferred embodiment has insulated gold contact pads (62) on the surface of the tongue and wires (63) connecting the contact pads to the reel servo motor (34) or other electronics. The preferred embodiment of the reel seat has mating electrical connections internal to the mating receiver section designed to establish an electrical connection between the reel seat and the reel.

Figure 6:
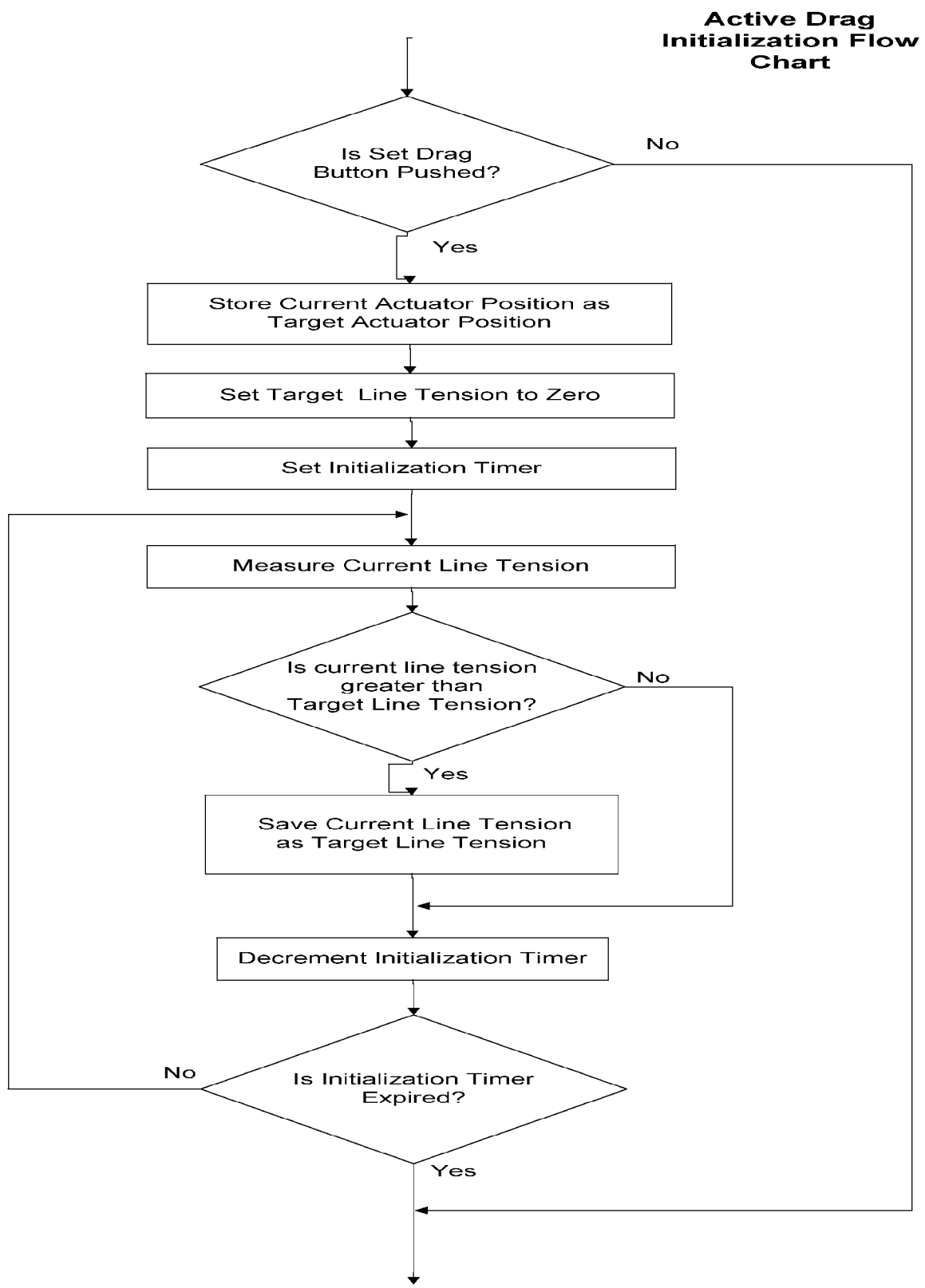

Flow chart in FIGS. 6 and 7 describe the drag servo system initialization node and operating mode fully. In basic terms however, the servo loop starts by reading the current line tension (CLT). If the CLT exceeds the target tension, the actuator motor (34) is driven an incremental amount in the direction to pull the drag lever back, thereby decreasing the drag tension by an incremental amount. If the CLT is less than the target tension AND the actuator motor is back off from the target position, the actuator motor is driven an incremental mount in the direction to push the drag lever forward, thereby increasing the drag tension by an incremental amount. Control returns to the start of the servo control loop.

While the invention has been particularly shown and described with reference to preferred embodiments thereof, it will be understood by those skilled in the art that various changes in form and details may be made therein without departing from the spirit and scope of the invention. For example, rather than a motor to control the active drag mechanism, one could implement a piezo element or other type of actuator. The active feedback loop could be collocated and integrated into the force measurement device on the pole and directly connected to the reel. The receiver could be connected directly to the force measurement device on the pole rather than through radio transmission.

What is claimed is:
1. A fishing system comprising:
(a) a fishing pole including a longitudinally elongated tapered rod having a larger proximal end and a smaller distal tip end, and
(b) a handle on said larger proximal end of said rod, and
(c) a plurality of line guides mounted to said rod intermittently spaced from said handle to said distal tip end configured to guide a fishing line from said distal tip end to said handle portion of said rod, and

(d) a reel seat affixed to said rod configured to receive and secure a fishing reel, and (e) a force measurement device configured, when in operational mode, to produce a response indicative of an externally generated force wherein the force measurement device generates a response indicative of a force applied in a substantially longitudinal direction of the pole, from proximal to distal tip end, which includes the force of said fishing line pulled through said line guides and wherein said response will vary over a range extending from a minimum response level indicative of a lower externally generated force to a maximum response level indicative of a higher externally generated force, and including a plurality of intermediate response levels between the minimum response level and the maximum response level, and wherein said response is substantially independent of flexure of said rod, and (f) a transmitter in communication with said force measurement device wherein said transmitter is configured to transmit a signal wherein the content of said signal includes information reflecting said response produced by said force measurement device, and (g) a receiver, physically separated from said transmitter, configured to receive said signal transmitted by said transmitter, and further configured to extract said force measurement device response content from said signal.

2. The fishing system of claim 1 further comprising:
(a) an audible sound generator in communication with said receiver configured to generate a sound which varies in relation to said extracted force measurement device response indicative of said externally generated force.

3. The fishing system of claim 1 further comprising:
(a) a visual display device in communication with said receiver configured to graphically display a visual representation which varies in relation to said extracted force measurement device response indicative of said externally generated force.

4. The fishing system of claim 1 further comprising:
(a) a data storage device in communication with said receiver configured to store data representing said extracted force measurement device response indicative of said externally generated force.

5. The fishing system of claim 1 further comprising:
(a) an electrical data connection on said receiver configured to allow external equipment to receive an electrical signal which varies in relation to said extracted force measurement device response indicative of said externally generated force.

6. The fishing system of claim 1 further comprising:
(a) an electronic micro processing unit in communication with said receiver wherein said processing unit is configured to transform said extracted force measurement device response from the time domain into the frequency domain using a Fourier transform algorithm or functional equivalent, and further configured to return the fundamental frequency which is the frequency with maximum response in the frequency domain of said transform, and
(b) a database containing a multitude of fish species and the primary fin beat frequency associated with each said fish species, and
(c) a method of searching said database by said primary fin beat frequency to identify said fish species with said primary fin beat frequency closest to said fundamental frequency calculated by said Fourier transform or functional equivalent, and
(d) a display device to report said fish species identified with said searching method.

7. The fishing system of claim 1 further comprising:
(a) an electronic micro processing unit in communication with said receiver wherein said electronic micro processing unit is configured to integrate said extracted force measurement device response over time, thereby producing a value representing the total power of said response, and
(b) a display device to report said power calculated by said electronic micro processing unit.

8. The fishing system of claim 1 further comprising:
(a) a fishing reel containing a spool configured to containing fishing line wherein said fishing reel contains a spool drag mechanism configured to apply a braking force to said spool to restrict the free rotation of said spool, and
(b) a drag control mechanism in communication with said force measurement device configured to modify said braking force applied by said spool drag mechanism in relation to said response of said force measurement device.

9. The fishing system of claim 1 further comprising:
(a) a reel seat configured to receive and secure a fishing reel wherein said reel seat contains electrical contacts configured to provide an electrical connection to said fishing reel when said fishing reel is attached and secured to said reel seat.

10. The fishing system of claim 1 wherein the system further comprises:
(a) a multitude of poles wherein each pole is attached to an independent reel, force measurement device and transmitter, and wherein each independent transmitter on each independent pole is configured to broadcast a signal wherein said signal includes information reflecting said response produced from said force measurement device attached to said independent pole, and
(b) a receiver configured to receive said multiple signals generated from said transmitters on said multiple poles.

11. The fishing system of claim 10 further comprising:
(a) an audible sound generator in communication with said receiver configured to generate a sound which varies in relation to said responses of said force measurement devices on said fishing poles indicative of said externally generated forces.

12. The fishing system of claim 10 further comprising:
(a) a visual display device in communication with said receiver configured to graphically display a visual representation which varies in relation to said responses of said force measurement devices on said fishing poles indicative of said externally generated forces.

13. The fishing system of claim 10 further comprising:
(a) a data storage device in communication with said receiver configured to store data representing said responses of said force measurement devices on said fishing poles indicative of said externally generated forces received by said receiver.

14. The fishing system of claim 10 further comprising:
(a) an electrical data connection configured to allow external equipment to receive an electrical signal which varies in relation to said responses of said force measurement devices indicative of said externally generated forces.

15. A fishing pole with an integrated line tension measuring device and transmitter, comprising:
(a) a fishing rod having a larger proximal end and a smaller distal tip end;
(b) a handle on said larger proximal end of said rod;

(c) a line guide arrangement configured to guide a fishing line from said distal tip end to said handle portion of said rod;

(d) a reel seat affixed to said rod configured to receive and secure a fishing reel;

(e) a force measurement device integrated with the fishing pole and configured, when in operational mode, to produce an electrical signal response indicative of an externally generated force wherein the force measurement device generates a response indicative of a force applied in a substantially longitudinal direction of the rod, from proximal to distal tip end, which includes the force of said fishing line pulled through said line guides and wherein said response will vary over a range extending from a minimum response level indicative of a lower externally generated force to a maximum response level indicative of a higher externally generated force, and including at least a plurality of intermediate response levels between the minimum response level and the maximum response level; and (f) a transmitter integrated with the fishing pole and in signal communication with said force measurement device, and wherein said transmitter is configured to transmit a signal, wherein the content of said signal includes information reflecting said response produced by said force measurement device.

16. The fishing pole of claim 15, further comprising:
a receiver, physically separated from said transmitter and remotely located from the fishing pole, configured to receive said signal transmitted by said transmitter, and further configured to extract said force measurement device response content from said signal.

17. The fishing pole of claim 16 further comprising:
an audible sound generator remotely located from said fishing pole and in communication with said receiver configured to generate a sound which varies in relation to said extracted force measurement device response indicative of said externally generated force.

18. The fishing pole of claim 16, further comprising:
a visual display device in communication with said receiver configured to graphically display a visual representation which varies in relation to said extracted force measurement device response indicative of said externally generated force.

19. The fishing pole of claim 18, wherein the visual display device is integrated with a fish finder system.

20. The fishing pole of claim 18, wherein the visual display device is configured to display measured line tension over time in a strip chart form.

21. The fishing pole of claim 16 further comprising:
a data storage device remote from said fishing pole and in communication with said receiver configured to store data representing said extracted force measurement device response indicative of said externally generated force.

22. The fishing pole of claim 16 further comprising:
an electrical data connection on said receiver configured to allow external equipment to receive an electrical signal which varies in relation to said extracted force measurement device response indicative of said externally generated force.

23. The fishing pole of claim 15 further comprising:
an electronic micro processing unit remote from said fishing pole, and in communication with said receiver wherein said processing unit is configured to transform said extracted force measurement device response from the time domain into the frequency domain using a Fourier transform algorithm or functional equivalent, and further configured to return the fundamental frequency which is the frequency with maximum response in the frequency domain of said transform;

a database accessible by the processing unit and containing a multitude of fish species and the primary fin beat frequency associated with each said fish species;

wherein the processing unit is configured to search said database to identify said fish species with said primary fin beat frequency closest to said fundamental frequency calculated by said Fourier transform or functional equivalent; and a display device to report said identified fish species.

24. The fishing pole of claim 15, further comprising:
an electronic micro processing unit remote from the fishing pole and in electronic communication with said receiver, wherein said electronic micro processing unit is configured to integrate said extracted force measurement device response over time, thereby producing a value representing the total power of said response, and a display device in electronic communication with the processing unit and remote from said fishing pole to report said power calculated by said electronic micro processing unit.

25. The fishing pole of claim 15, further comprising:
a fishing reel containing a spool configured to containing fishing line wherein said fishing reel contains a spool drag mechanism configured to apply a braking force to said spool to restrict the free rotation of said spool, and an active electrical drag control mechanism in electrical communication with said force measurement device to receive said electrical signal response, and configured to modify said braking force applied by said spool drag mechanism in dependence on said electrical signal response.

26. The fishing pole of claim 25, wherein said drag control mechanism comprises an electrically powered actuator coupled to said drag mechanism, and a servo control system responsive to said electrical signal response to actively control said braking force.

27. The fishing pole of claim 15, wherein said reel seat contains a plurality of electrical contacts configured to provide an electrical connection to corresponding electrical contacts on said fishing reel when said fishing reel is attached and secured to said reel seat.

28. The fishing pole of claim 15, wherein said transmitter is configured to transmit a wireless signal whose content includes information reflecting said response produced by said force measurement device.

29. A remote monitoring system for a fishing pole including a larger proximal end and a smaller distal tip end, a handle on the larger proximal end of the pole, a line guide arrangement configured to guide a fishing line from the distal tip end to the handle, and a reel seat configured to receive and secure a fishing reel to the handle, the remote monitoring system comprising:

a force measurement device configured for integration with the fishing pole and configured, when in operational mode, to produce an electrical signal response indicative of an externally generated force wherein the force measurement device generates a response indicative of a force applied in a substantially longitudinal direction of the rod, from proximal to distal tip end, which includes the force of the fishing line pulled through said line guides and wherein said response will vary over a range extending from a minimum response level indicative of a lower externally generated force to a maximum response level indicative of a higher externally generated force, and including at least a plurality of intermediate response levels between the minimum response level and the maximum response level; and a transmitter configured for integration with the fishing pole and in signal communication with the force measurement device, and wherein the transmitter is configured to transmit a signal, wherein the content of said signal includes information reflecting said response produced by said force measurement device;

a receiver, configured for remote location from the fishing pole, and configured to receive said signal transmitted by said transmitter, and further configured to extract said force measurement device response content from said signal.

30. The system of claim 29, further comprising:

a visual display device in communication with said receiver configured to graphically display a visual representation which varies in relation to said extracted force measurement device response indicative of said externally generated force.

31. The system of claim 30, wherein the visual display device is configured to display measured line tension over time.

32. The system of claim 29, further comprising:

a data storage device remote from the fishing pole and in communication with said receiver configured to store data representing said extracted force measurement device response indicative of said externally generated force.

33. The system of claim 29, wherein said transmitter is configured to transmit a wireless signal whose content includes information reflecting said response produced by said force measurement device, and said received is configured to receive said wireless signal.

* * * * *